United States Patent [19]

Fisher

[11] 4,301,677
[45] Nov. 24, 1981

[54] MEASURING DEVICE FOR USE WITH TUBULAR PRODUCTS

[75] Inventor: Frederick M. Fisher, Enfield, Conn.

[73] Assignee: Electric Power Research Institute, Palo Alto, Calif.

[21] Appl. No.: 81,657

[22] Filed: Oct. 4, 1979

[51] Int. Cl.³ ............................................... G01B 5/28
[52] U.S. Cl. .......................................... 73/105; 73/86; 33/178 F
[58] Field of Search ............................ 73/105, 104, 86; 33/178 F, 178 E, 174 Q

[56] References Cited

U.S. PATENT DOCUMENTS

| | | | |
|---|---|---|---|
| 2,656,613 | 10/1953 | Goble | 33/178 F |
| 2,915,830 | 12/1959 | Price | 33/178 F |
| 3,010,212 | 11/1961 | Kinley | 33/178 F |
| 3,024,651 | 3/1962 | McGlasson | 33/178 F |
| 3,628,029 | 12/1971 | Tompkins | |
| 4,235,020 | 11/1980 | Davis et al. | 33/178 F |

*Primary Examiner*—Anthony V. Ciarlante
*Attorney, Agent, or Firm*—Flehr, Hohbach, Test

[57] ABSTRACT

Apparatus for detecting variations in the internal dimensions of a pipe includes a plurality of cantilever members for engaging the internal surface and strain gauges mounted on the cantilever members which are responsive to the flexing of the cantilever members. A Wheatstone bridge is utilized to measure changes in resistance of the strain gauges and hence the amount of flexing of the cantilevers due to undulations in the internal surface. The apparatus is particularly useful in detecting and measuring dents in tubes of nuclear power plant steam generators caused by corrosion of steel support plates.

7 Claims, 4 Drawing Figures

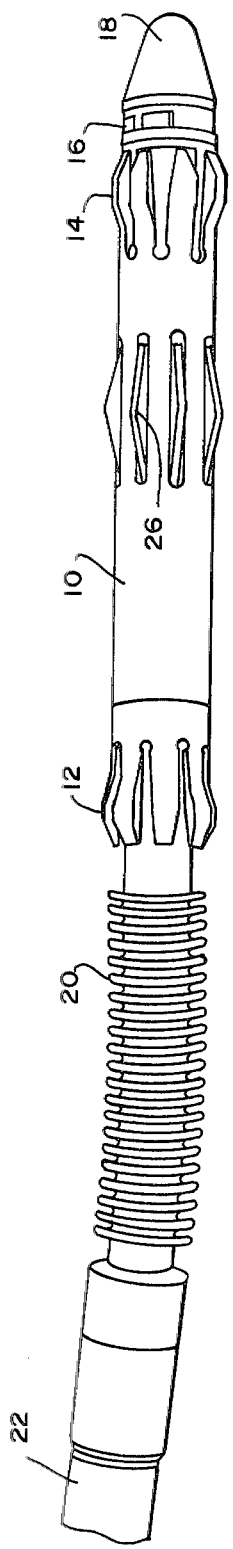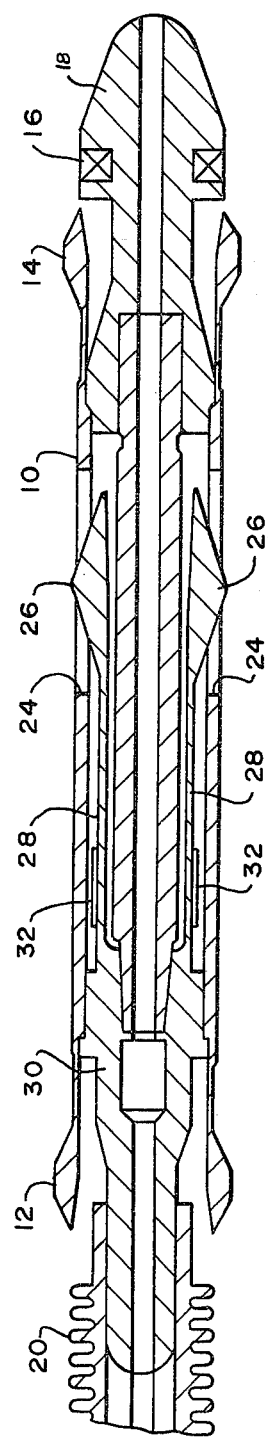

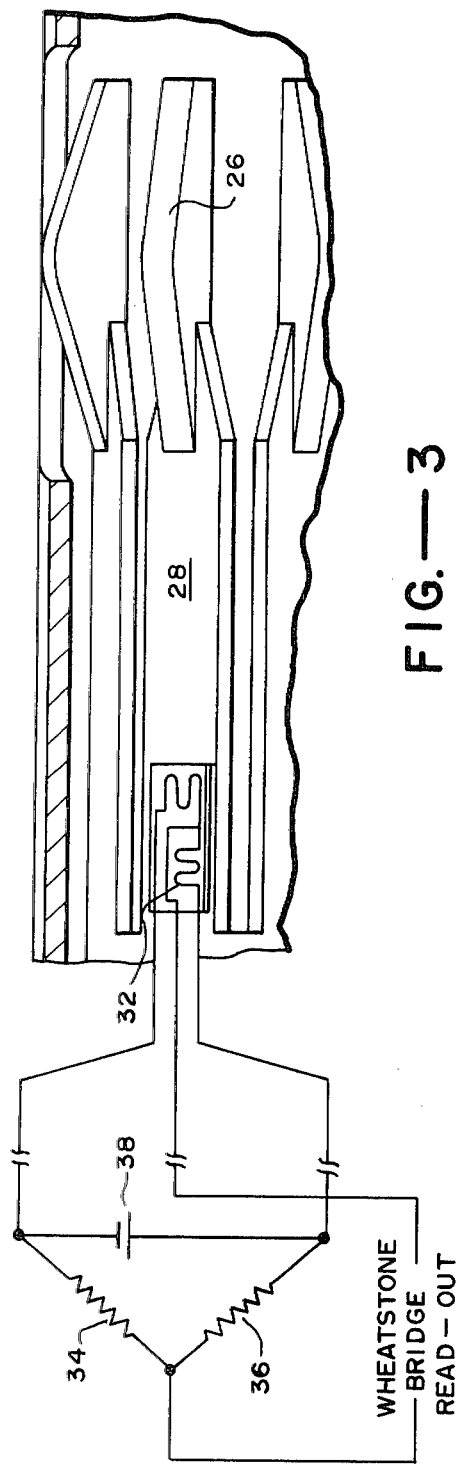
FIG.—3
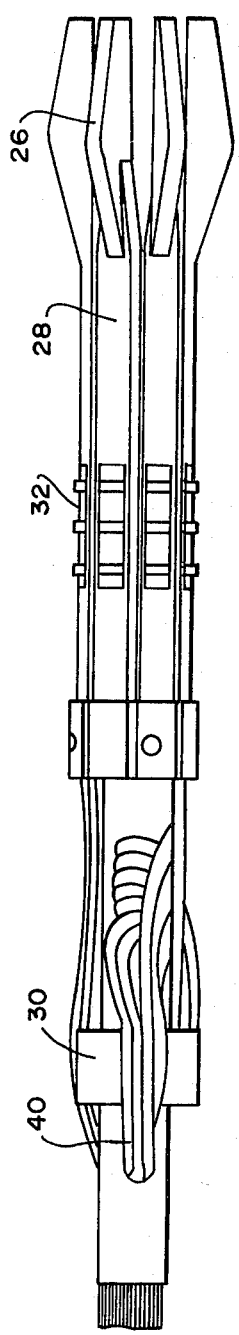
FIG.—4

MEASURING DEVICE FOR USE WITH TUBULAR PRODUCTS

This invention relates generally to measuring apparatus, and more particularly the invention relates to apparatus for detecting variations in the internal dimensions of a tubular product such as a pipe and the like.

Defects in the internal surfaces of steam generator tubes in nuclear power plants can result in failure of the tubes. More particularly, denting of steam generator tubes due to corrosion of carbon steel support plates occurs over a period of time and must be monitored. Defects such as pits and cracks can be monitored by eddy current sensors which detect variations in conductivity characteristics of the internal surface. However, such sensors are less reliable for measuring denting at support plates because of the complex electromagnetic response created by the steel support plates.

Accordingly, an object of the present invention is an improved apparatus for detecting variations in the internal dimensions of a tube and the like.

Another object of the invention is improved means for monitoring denting of tubes due to corrosion of support plates.

A feature of the invention is the use of flexible members having surface portions for engaging the internal surface of a tubular product and transducer means for sensing flex of the members due to variations of the internal surface.

Another feature of the invention is a housing having a plurality of spring means for engaging the internal surface of a pipe maintaining the apparatus generally in line with the center line of the pipe.

In a preferred embodiment each flexible member is a cantilever structure independently mounted and independently responding to surface variations. Transducer means is mounted on the flexible member near its support end with the surface portion for engaging the internal surface being located near the opposite end. The transducer means preferably comprises a strain gauge which is a component in a Wheat-stone bridge whereby variations in resistance of the strain gauge due to flexing of the cantilever is detected by the bridge.

These and other objects and features of the invention will be more readily apparent from the following detailed description and appended claims when taken with the drawing.

In the drawing,

FIG. 1 is a perspective view of measuring apparatus in accordance with one embodiment of the invention.

FIG. 2 is a section view of the apparatus of FIG. 1.

FIG. 3 is an electrical schematic illustrating the function of the flexible member in the apparatus of FIG. 1.

FIG. 4 is a plan view of a portion of the apparatus of FIG. 1 with the outer housing removed.

Referring now to the drawings, FIG. 1 is a perspective view of measuring apparatus in accordance with one embodiment of the invention. The apparatus includes a housing 10 of suitable material such as aluminum or steel having a plurality of springlike feelers 12 and 14 at either end of the housing. Feelers 12 and 14 are preferably formed of the housing material and are positioned about housing 10 to engage the inner surface of a tubular product and thereby maintain the apparatus positioned on the center line of the tubular product. In a preferred embodiment the feelers 12, 14 are positioned at 45° intervals about the circumference of housing 10.

At the forward end of housing 10 is an eddy current locating coil 16 which is wound on a non-metallic bobbin 18 of wood or other suitable material and which projects from support housing 10.

At the other end of the apparatus is a flexible coupling 20 which couples the apparatus to drive means such as a nylon tube 22 for moving the apparatus through the tubular product being inspected. Coupling 20 and tube 22 include a cavity through which electrical wiring is provided.

Projecting through openings 24 in housing 10 intermediate the centering springs 12 and 14 are a plurality of members 26 which engage the inner surface of the tubular product being inspected. As will be described further hereinbelow, the members 26 comprise surface portions of flexible members such as cantilevers which flex in response to undulations such as dents in the inner surface of the tubular product being inspected.

FIG. 2 is a section view of the apparatus of FIG. 1 which further illustrates the components of the measuring apparatus and the mounting of components within housing 10. Bobbin 18 which supports the eddy current locating coil 16 extends from one end of housing 10 and is of suitable configuration to accommodate the flexing of centering spring 14. Members 26 extend through windows 24 in housing 10 and are provided on the flexing end of cantilevers 28. The other ends of cantilevers 28 are affixed to or comprise part of support member 30 which is mounted within housing 10. Support member 30 receives the flexible coupler 20. The cantilevers are made of suitable material such as steel which has the requisite resilience. Mounted on cantilever 28 near the support ends are transducer means such as strain gauges 32 which change in resistive value upon the flexing of cantilevers 28. Support member 30 is of suitable configuration to accommodate the flexing of centering spring 12.

FIG. 3 is an electrical schematic illustrating the function of the cantilever 28 and strain gauge 32 in a Wheatstone bridge type of readout circuit. The strain gauge 32 comprises two resistors in the Wheatstone bridge along with fixed resistors 34 and 36. A suitable DC voltage source 38 is provided for energizing the bridge. As the measuring apparatus is moved through the tubular produce under inspection, the eddy current locating coil will give an indication of an approaching steel support plate for which the Wheatstone bridge readout indicates the presence of denting. Thus, as the cantilever 28 flexes in response to the surface portion 26 engaging undulations in the inner surface of a tubular product, the readout from the Wheatstone bridge will likewise vary, thereby giving an indication of the inner surface undulation.

FIG. 4 is a plan view of the apparatus of FIGS. 1 and 2 with the outer housing removed to further illustrate the cantilever members 28 with the strain gauges 32 mounted thereon. Conductive wires 40 interconnect the strain gauges 32 to the external Wheatstone bridge readout through support 30 and the flexible coupling.

Apparatus in accordance with the present invention has proved to be particularly useful in inspecting tubes in steam generators in nuclear power plants and particularly the presence of dents in the tubes caused by corrosion of steel support plates which are not readily measured by prior art eddy current means.

While the invention has been described with reference to one embodiment and one application, the description is illustrative of the invention and is not to be construed as limiting the invention. Various modifications and applications may occur to those skilled in the art without departing from the true spirit and scope of the invention as defined by the appended claims.

What is claimed is:

1. Apparatus for detecting denting in the internal surface of a tube due to corrosion of support plates comprising support means of suitable dimensions for moving through said tube, said support means including an outer housing and a plurality of spring means for engaging said internal surface and maintaining said outer housing generally in line with the center line of said tube; a plurality of flexible members extending from said support means, each of said flexible members having a surface portion for engaging said internal surface; transducer means mounted on each of said flexible members for sensing flex of said member; and eddy current detection means for detecting the presence of tube support structures.

2. Apparatus as defined by claim 1 wherein said housing includes a plurality of openings and said surface portions of said flexible members extend through said openings.

3. Apparatus as defined by claims 1 or 2 wherein each of said flexible members comprises a cantilever having an extended end and a supported end, said surface portion being near said extended end and said transducer means being mounted to said member near said supported end.

4. Apparatus as defined by claim 3 wherein said transducer means comprises a strain gauge.

5. Apparatus as defined by claim 4 wherein said transducer means further includes Wheatstone bridge means for detecting changes in said strain gauge as said cantilever is flexed.

6. Apparatus as defined by claim 5 and including means for moving said support means through said tube.

7. Apparatus as defined by claim 1 wherein said transducer means comprises a strain gauge which has an electrical resistance which changes in response to flexing of said member and Wheatstone bridge means for detecting changes in said electrical resistance.

* * * * *